United States Patent
Wang et al.

(10) Patent No.: US 9,247,248 B2
(45) Date of Patent: Jan. 26, 2016

(54) MODE SEARCHING AND EARLY TERMINATION OF A VIDEO PICTURE AND FAST COMPRESSION OF VARIABLE LENGTH SYMBOLS

(71) Applicant: SONY COMPUTER ENTERTAINMENT INC., Tokyo (JP)

(72) Inventors: Jason N. Wang, Palo Alto, CA (US); Rathish Krishnan, Foster City, CA (US); Michael Kutner, Mountain View, CA (US); Milan Mehta, Newark, CA (US); Cheng Huang, Foster City, CA (US); Yi Luo, Cupertino, CA (US); Jon Brelin, Cupertino, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 280 days.

(21) Appl. No.: 13/769,735

(22) Filed: Feb. 18, 2013

(65) Prior Publication Data

US 2013/0156103 A1 Jun. 20, 2013

Related U.S. Application Data

(62) Division of application No. 12/553,073, filed on Sep. 2, 2009, now Pat. No. 8,379,718.

(51) Int. Cl.
*H04B 1/66* (2006.01)
*H04N 19/50* (2014.01)
*H04N 19/176* (2014.01)
(Continued)

(52) U.S. Cl.
CPC ....... *H04N 19/00569* (2013.01); *H04N 19/103* (2014.11); *H04N 19/109* (2014.11); *H04N 19/11* (2014.11); *H04N 19/147* (2014.11); *H04N 19/174* (2014.11); *H04N 19/176* (2014.11); *H04N 19/436* (2014.11); *H04N 19/50* (2014.11); *H04N 19/61* (2014.11); *H04N 19/86* (2014.11)

(58) Field of Classification Search
None
See application file for complete search history.

(56) References Cited

U.S. PATENT DOCUMENTS 7,630,565 B2 12/2009 Linzer
8,000,388 B2 8/2011 Huang et al.
(Continued)

OTHER PUBLICATIONS

"Information technology—Coding of audio-visual objects—Part 10: Advanced Video Coding, Edition 5" Oct. 1, 2004, International Organization for Standardization, Geneva Switzerland.
(Continued)

*Primary Examiner* — Phirin Sam
(74) *Attorney, Agent, or Firm* — Joshua D. Isenberg; JDI Patent

(57) ABSTRACT

Mode searching and early termination of a video picture may include determining the cost value of a simple intra-mode prediction of the video picture; determining the cost value of an inter-mode prediction of the video picture; determining a threshold value based on a given quantization parameter (QP); comparing the cost value of the simple intra-mode prediction to the sum of the cost value of the inter-mode prediction and the threshold value; and performing a mode-prediction of the video picture in accordance with the result obtained. Fast compression of variable length symbols may include receiving a variable length symbol with one or more tokens; combining the one or more tokens in the variable length symbol to form a token combination; and determining a bit representation of the token combination in correspondence to a probability threshold associated with the token combination.

10 Claims, 9 Drawing Sheets

(51) Int. Cl.
*H04N 19/147* (2014.01)
*H04N 19/61* (2014.01)
*H04N 19/11* (2014.01)
*H04N 19/103* (2014.01)
*H04N 19/109* (2014.01)
*H04N 19/174* (2014.01)
*H04N 19/436* (2014.01)
*H04N 19/86* (2014.01)

(56) References Cited

U.S. PATENT DOCUMENTS

| | | | |
|---|---|---|---|
| 8,379,718 B2 | 2/2013 | Wang et al. | |
| 8,848,798 B2* | 9/2014 | Fujisawa et al. | 375/240.18 |
| 2002/0031184 A1 | 3/2002 | Iwata | |
| 2004/0126027 A1* | 7/2004 | Park et al. | 382/239 |
| 2005/0069211 A1* | 3/2005 | Lee et al. | 382/239 |
| 2007/0086528 A1 | 4/2007 | Mauchly et al. | |
| 2007/0133681 A1 | 6/2007 | Ho | |
| 2007/0217508 A1* | 9/2007 | Shimada et al. | 375/240.03 |
| 2007/0274385 A1* | 11/2007 | He | 375/240.12 |
| 2008/0002770 A1* | 1/2008 | Ugur et al. | 375/240.16 |
| 2008/0069211 A1* | 3/2008 | Kim et al. | 375/240.13 |
| 2008/0112481 A1* | 5/2008 | Hsaing et al. | 375/240.03 |
| 2008/0137743 A1* | 6/2008 | Kim et al. | 375/240.13 |
| 2008/0310502 A1* | 12/2008 | Kim et al. | 375/240.02 |
| 2009/0097768 A1* | 4/2009 | Seregin et al. | 382/248 |
| 2009/0110067 A1 | 4/2009 | Sekiguchi et al. | |
| 2009/0238283 A1 | 9/2009 | Han | |
| 2009/0245664 A1 | 10/2009 | Matsumoto et al. | |
| 2010/0061464 A1 | 3/2010 | Watanabe | |
| 2010/0091880 A1 | 4/2010 | Jia | |
| 2011/0047155 A1* | 2/2011 | Sohn et al. | 707/736 |
| 2011/0051806 A1 | 3/2011 | Lee | |
| 2011/0051809 A1 | 3/2011 | Lee | |
| 2011/0051813 A1 | 3/2011 | Krishnan et al. | |
| 2011/0164677 A1 | 7/2011 | Lu et al. | |
| 2012/0257678 A1 | 10/2012 | Zhou et al. | |

OTHER PUBLICATIONS

Gary J. Sullivan and Thomas Wiegand " Rate—Distortion Optimization for Video Compression" IEEE Signal Processing Magazine, Nov. 1998, p. 74-90.

Cell Broadband Engine Architecture "http://cell.scei.co.jp", Aug. 8, 2005 ,Version 10.

Office Action dated Jul. 5, 2012 in U.S. Appl. No. 12/553,073.

\* cited by examiner

MODE SEARCHING AND EARLY TERMINATION OF A VIDEO PICTURE AND FAST COMPRESSION OF VARIABLE LENGTH SYMBOLS

CLAIM OF PRIORITY

This application is a divisional of and claims priority to commonly-assigned co-pending U.S. patent application Ser. No. 12/553,073, filed Sep. 2, 2009 (U.S. Pat. No. 8,379,718), the entire contents of which are incorporated herein by reference.

CROSS REFERENCE TO RELATED APPLICATIONS

This application is related to commonly-assigned co-pending U.S. patent application Ser. No. 12/553,070, filed Sep. 2, 2009, the entire contents of which are incorporated herein by reference.

This application is related to commonly-assigned co-pending U.S. patent application Ser. No. 12/553,069, filed Sep. 2, 2009, the entire contents of which are incorporated herein by reference.

This application is related to commonly-assigned co-pending U.S. patent application Ser. No. 12/553,075, filed Sep. 2, 2009, the entire contents of which are incorporated herein by reference.

FIELD OF THE INVENTION

Embodiments of the invention are related to video encoding and more particularly to parallel encoding of digital pictures.

BACKGROUND OF INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating the spatial and temporal redundancies in the picture and among successive pictures. Through the use of such compression standards, video contents can be carried in highly compressed video bit streams, and thus efficiently stored in disks or transmitted over networks.

MPEG-4 AVC (Advanced Video Coding), also known as H.264, is a video compression standard that offers significantly greater compression than its predecessors. The H.264 standard is expected to offer up to twice the compression of the earlier MPEG-2 standard. The H.264 standard is also expected to offer improvements in perceptual quality. As a result, more and more video content is being delivered in the form of AVC(H.264)-coded streams. Two rival DVD formats, the HD-DVD format and the Blu-Ray Disc format support H.264/AVC High Profile decoding as a mandatory player feature. AVC(H.264) coding is described in detail in ISO/IEC 14496-10:2009, "Information technology—Coding of audio-visual objects—Part 10: Advanced Video Coding, Edition 5" Jun. 13, 2009, which is incorporated herein by reference. A copy may be downloaded at the following URL: http://www.iso.org/iso/iso_catalogue/catalogue_tc/catalogue_detail.htm?csnumber=52974.

Video signal coding tends to be a computationally intensive application requiring a high memory bandwidth. Multi-processor systems have been developed with high computing performance and relatively lower power consumption. Some multi-processor systems have dedicated local memory associated with each processor core. It is appealing to implement video encoding on a multi-processor platform since the memory bandwidth in such systems may scale with the number of processors. However, due to the complexity of the encoding process it is difficult to optimize parallel video encoding for multi-processor platforms having more than two processor cores.

The video encoding process removes any spatial and temporal redundancies between and within video pictures, which creates data dependencies among video pixels. When encoding a video stream in parallel, these data dependencies tend to slow down the encoding process or lower the quality of the video stream being encoded. For example, encoding multiple sections of a given video picture in parallel may require each section to use data from another section, which is momentarily unavailable because that given section is currently being processed. The data dependency issue may be resolved by slowing down the encoding process, such that sections are sequentially encoded to avoid missing data dependencies. However, this may cause very large encoding delays. The data dependency issue may also be resolved by creating artificial data isolations to fill in for the currently inaccessible data dependency. This, however, may reduce the encoding quality of the video stream.

It is within this context that embodiments of the present invention arise.

BRIEF DESCRIPTION OF THE DRAWINGS

The teachings of embodiments of the present invention can be readily understood by considering the following detailed description in conjunction with the accompanying drawings, in which.

DESCRIPTION OF THE SPECIFIC EMBODIMENTS

Figure 1:
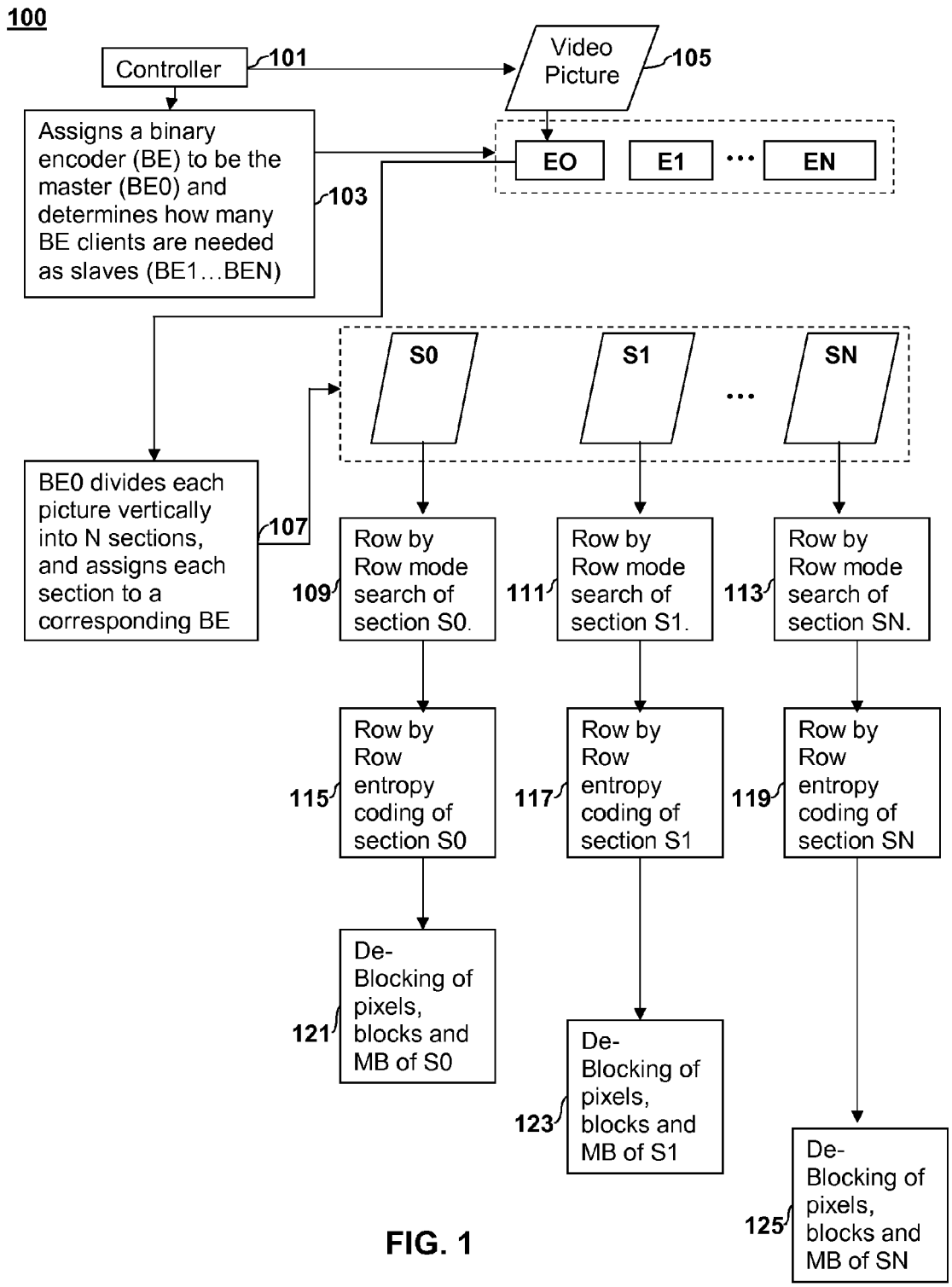
FIG. 1 is a flow diagram illustrating an example of parallel video encoding in accordance with an embodiment of the present invention.

FIG. 1 is a flow diagram illustrating an example of parallel video encoding 100 that deals with the issue of data dependency according to an embodiment of the present invention. As used herein, parallel video encoding generally refers to encoding different sections of a video picture or different video pictures in such a way that process of encoding the respective sections or pictures overlap in time. In the prophetic example illustrated in FIG. 1, a controller 101 (e.g., a digital computer processor) initially chooses an encoder unit (labeled E0) from among a plurality of such units available in a processing system to act as the master/server encoder for the task of encoding one or more video pictures. The controller 101 also determines how many additional encoder units are needed as clients/slaves of the master/server encoder E0 to perform parallel encoding as indicated at 103. The client/slave encoder units are labeled as E1 . . . EN, where N represents the total number of client/slave encoders that perform encoding in parallel with the master/server unit E0. The master server encoder unit E0, and client/slave encoder units E1 . . . EN may be implemented in the form of digital co-processors that may be less computationally intensive devices than the controller 101. Each such co-processor may optionally include an associated local storage that the co-process may quickly access. The local storage may store coded instructions that the co-processor can use to implement a part of the task of encoding a picture. The local storage may also store data to be processed by the co-processor by executing the stored instructions and/or data generated as a result of executing the stored instructions. In an alternative embodiment, each encoder unit may be an individual digital computer processor, e.g., a parallel processing system such as a CELL processor.

By way of example, the controller 101 may select encoder unit E0 as the master/server. The controller 101 may send encoder unit E0 a task package which may include encoded information that the master/server encoder E0 may use to determine where find the video stream, how to encode the video stream, and a how to categorize the content of the video stream. In determining how to encode the video stream, the following information may be included in the task package: 1) information regarding whether the bit rate should be high or low; 2) standard constraints including: the decoder level to be associated with the video stream, e.g., whether a simple or complex decoder will be used at the receiving end, the memory usage associated with the video stream, and a prediction mode associated with the video stream; and 3) feature constraints including: whether the video stream is associated with a fast playback mode or not, how fast the playback associated with the video stream is, and the device on which the video stream is to be played back. The categorization of content may include the color coding used (e.g., RGB or YUV) or a color matrix used to convert the video stream from one color code to another.

After the master/server encoder E0 receives the task package, it may begin the encoding process for a given video stream. The encoding process will typically begin with the first video picture of the video stream, but for the sake of example, the video encoding process is described below for an arbitrary video picture 105. The master/server encoder E0 divides the video picture 105 into N+1 vertical sections that correspond to the N+1 encoders available for parallel processing, as indicated at 107. Thus, in the present example, E0 is assigned section S0, E1 is assigned section S1, and so on and so forth up until the $N^{th}$ encoder unit EN, which is assigned section SN.

Each vertical section S0, S1, . . . SN includes data representing a portion of the complete video picture 105. Each vertical section includes at least one complete column of subsections of the picture. Examples of subsections include, but are not limited to individual pixels, blocks (4×4 groups of pixels), sub-macroblocks (8×8 groups of pixels), and macroblocks (MB) (16×16 groups of pixels). As used herein, a complete column refers to a column that extends from a top of the picture to a bottom of the picture. By way of example, and not by way of limitation, one complete column of macroblocks would be portion of a picture 1 macroblock wide by M macroblocks tall, where M is the number of rows of macroblocks in the picture.

Each encoder unit E0, E1, . . . , EN performs a mode search on its respective section S0, S1, . . . SN to determine whether each subsection (e.g., each MB) of the respective section should be inter-coded or intra-coded. This process normally includes a motion search for a best inter-prediction match, an intra search for a best intra-prediction match, and an inter/intra comparison to decide how the MB should be coded. Master/server unit E0 begins by doing a mode search for the first row of macroblocks in order to determine whether each macroblock should be inter-coded or intra-coded as described at 109.

The master/server encoder E0 sends the search result of the right most MB and a proposed prediction mode of the left most MB in the right neighbor's section of each row to unit E1. Consequently, unit E1 has to wait for unit E0's right most MB mode search result and proposed prediction mode for E1's left most MB before unit E1 can start its mode search of this MB row. For the same reason, unit E2 waits for unit E1's right most MB result and proposed prediction mode for E2's left most MB, and so on. As the result, each encoder unit starts one MB row later than the unit handling its left neighbor section.

Because MB mode search and entropy encoding of a MB depend on its upper right neighbor MB, to finish the right most MB prediction search an encoder unit for a section that has a right neighbor needs the prediction mode of the left most MB in the right neighbor section. But, in this encoder implementation, the data dependencies from a right section to its left neighbor are not allowed. To solve this problem, the encoder unit for the left section has to search for the prediction mode of the first MB in its right neighbor section. Because the prediction may be done without knowing the correct upper right MB mode, the result may not be optimal. However, experiments have shown that this prediction mode is very close to the best. Then, the encoder unit for the right neighbor section only can accept this prediction mode and use this prediction mode to encode the left most MB in the right neighbor section into the output bit stream. In this way it is possible to guarantee that the entropy encoding result will be correct with very small loss in quality.

The mode searches carried out by the different units may overlap in time. For example, to some extent, unit E1 may be involved in a mode search for its $(N-1)^{th}$ row of subsections as described at 111 while unit EN is involved in a mode search for its first row of subsections as described at 113. This mode search is then repeated for the next row of subsections in each vertical section until mode searching for the entire video picture has been completed.

The mode search may include a task known as motion compensation to determine a mode result, e.g., whether intra-coding or inter-coding should be used. Specifically, a mode search performed on a section may produce a motion vector (MV) and a transform coefficient that are subsequently used along with one or more reference sections during motion compensation. The motion compensation may use these motion vectors and transform coefficients to describe the current section in terms of the transformation of a reference section to a currently processing section.

As used herein, the term motion compensation generally refers to a process to build pixel predictors from a reference picture. By way of example, and not by way of limitation, in certain encoder implementations motion compensation may be integrated with inter search process. After inter search, the encoder may use the resulting motion vector to build pixel predictors. Then, the encoder may use the original input pixel and pixel predictor to calculate a prediction error referred to as residual pixels. A discrete cosine transform (DCT) may be used to translate residual pixels into residual DCT coefficients. A process known as quantization reduces the number of symbols used to represent these DCT coefficients. The resulting quantized DCT coefficients may be used by an entropy coding task.

Once it is determined whether the subsections in each row should be inter-coded or intra-coded, entropy coding may be performed. As used herein, the term entropy coding generally refers to a task by which prediction modes, motion vectors and quantized residual DCT coefficients are translated into a compressed digital representation. The input of entropy coding task is the mode search result. The output is a compressed digital representation of the mode search result.

To further optimize the encoding of a video stream, a method of compressing variable length symbols may be implemented within the entropy encoding task. The output of the entropy encoding task for a given section of a picture may include a variable length code representing DCT coefficients for the residual pixels in the given section. The variable length code may be composed of multiple tokens each of which represents a subsection of the variable length code. The bit representation of these tokens are often compressed. Existing entropy coding techniques often use lookup tables to determine a bit representation for each token. This can lead to inefficiencies. In certain embodiments of the present invention entropy coding may be made more efficient by combining two or more tokens together. The resulting combination may be compared against a specially generated lookup table to determine a bit representation for the token combination. Such embodiments are discussed in detail below with respect to FIGS. 6A-6B.

The encoding process may include additional tasks. For example, within the mode search task, after mode search process, the encoder runs a decoder emulation process which is called encoder local decoding. In encoder local decoding process, the encoder uses inverse quantization to recover residual DCT coefficients from quantized DCT coefficients. Then, it uses inverse DCT to get residual pixels (prediction error) from residual coefficients. Combining the prediction error with pixel predictors, the encoder can get an uncompressed picture which should be exactly the same as the uncompressed picture generated by a standalone decoder. The uncompressed picture may be sent to a de-blocking task for de-blocking. After de-blocking, the uncompressed picture may be saved and used as a reference picture to do inter prediction for future pictures.

Both the de-blocking task and entropy coding task may start when the mode search task is finished for one MB row. There is no timing dependency between de-blocking and entropy. However, as an extra timing constraint, the de-blocking task for one section may have to wait for completion of de-blocking of each MB row on a neighboring section due to data dependencies within the de-blocking task itself. For example, the de-blocking task on a given section may need to wait for the de-blocking of its left neighbor to send the de-blocking result of the right most MB of the left neighbor to the encoder unit handling the given section.

Furthermore, for de-blocking, there may be a one MB column overlap between the encoder units for neighboring vertical sections. For a MB shared by encoder units for two adjacent sections, the encoder unit that de-blocks the left section may perform vertical edge de-blocking on the shared MB and the encoder unit that de-blocks the right section may perform horizontal edge de-blocking on the shared MB. By way of example, the de-blocking task for the macroblocks in the first column of section S1 may be shared between section S0's encoder unit E0 and section S1's encoder unit E1. Encoder unit E0 may de-block the vertical edges of the macroblocks in the left most column of section S1 and encoder unit E1 may de-block the horizontal edges of these macroblocks.

Referring again to the example illustrated in FIG. 1, the master/slave encoder unit E0 begins by entropy encoding for each subsection in the current row of section S0 as described at 115. Unit E1 may simultaneously entropy encodes each subsection in the current row of section S1 as described at 117. Unit E2 may also simultaneously entropy encodes each subsection in its current row of section S2 as described at 119. At a certain point, enough of a given section is encoded such that the de-blocking process for that section may begin. Specifically, de-blocking of section S0 by the master/server encoder E0 is indicated at 121. De-blocking of section S1 by the encoder E1 is indicated at 123. De-blocking of section SN by the encoder EN is indicated at 125.

The de-blocking process may be used to average out pixels at the block or MB boundaries. This is done to ensure that the encoded video picture fairly represents the original video picture. Initially the pixels, blocks, and macroblocks of the first row of S0 are de-blocked by master encoder unit E0 and this data is transferred to slave encoder unit E1, such that it may begin de-blocking of S1. Once the master encoder unit E0 has transferred data from the de-blocking of the first row of S0 to slave encoder unit E1, it may begin de-blocking of its next row. The data from the de-blocking of the first row of S1 is then transferred to its neighbor BE so that it may begin de-blocking of its first row. This continues until the second to last encoder unit finishes de-blocking its first row and transfers its data to the last encoder unit EN. The last encoder unit EN then uses the data transferred from its neighbor to de-block the first row of SN. Once de-blocking of all pixels, blocks, and macroblocks of each section of a given picture are complete, a coded picture results. It is important to note that the de-blocking of each video picture section occurs in parallel, but may involve a slight delay in the start of deblocking for certain sections because of the data dependency of a given vertical section on its neighboring video picture section.

Figure 2:
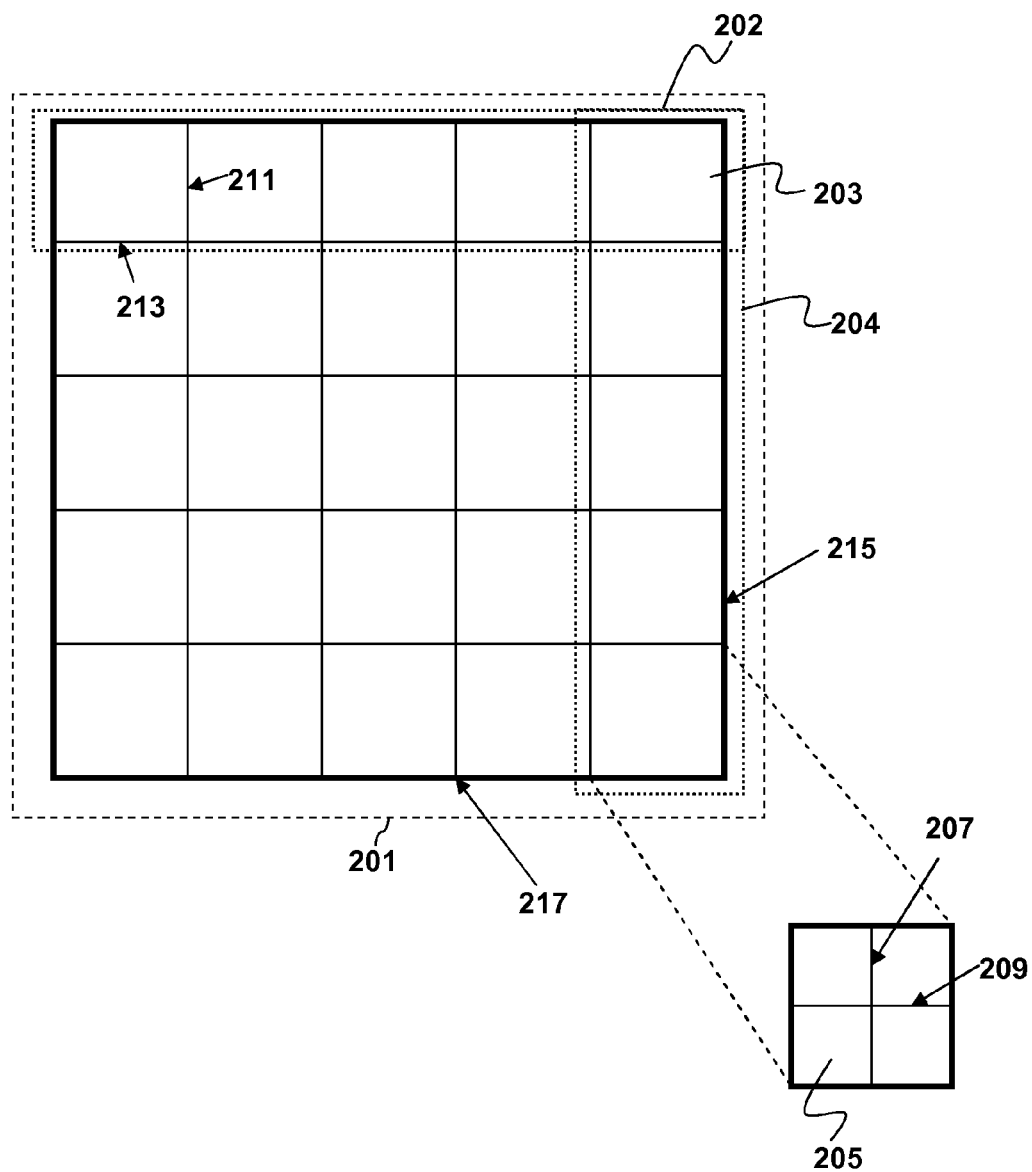
FIG. 2 provides an example of the partitioning of a video picture for parallel video encoding in accordance with an embodiment of the present invention.

FIG. 2 provides an example 200 of a video picture section partitioned into a number of macroblocks, which will be used to further illustrate the de-blocking process. In this example, a video picture section 201 contains one or more rows 202 of macroblocks 203 and one or more columns 204 of macroblocks 203. Each MB is made up of one or more rows of sub-macroblocks 205 and one or more columns of sub-macroblocks 205. Each sub-macroblock is made up of one or more rows of blocks and one or more columns of blocks. In de-blocking a video picture section, averaging of pixels will need to be performed at each vertical boundary 207 between horizontally adjacent blocks, sub-macroblocks and at each horizontal boundary 209 between vertically adjacent blocks and sub-macroblocks. Furthermore, the pixels at each vertical MB boundary 211 and horizontal MB boundary 213 will have to be averaged. In addition, each vertical section boundary 215 and each horizontal section boundary 217 may optionally be averaged with its neighbor section to as part of de-blocking process of a given picture.

Figure 3:
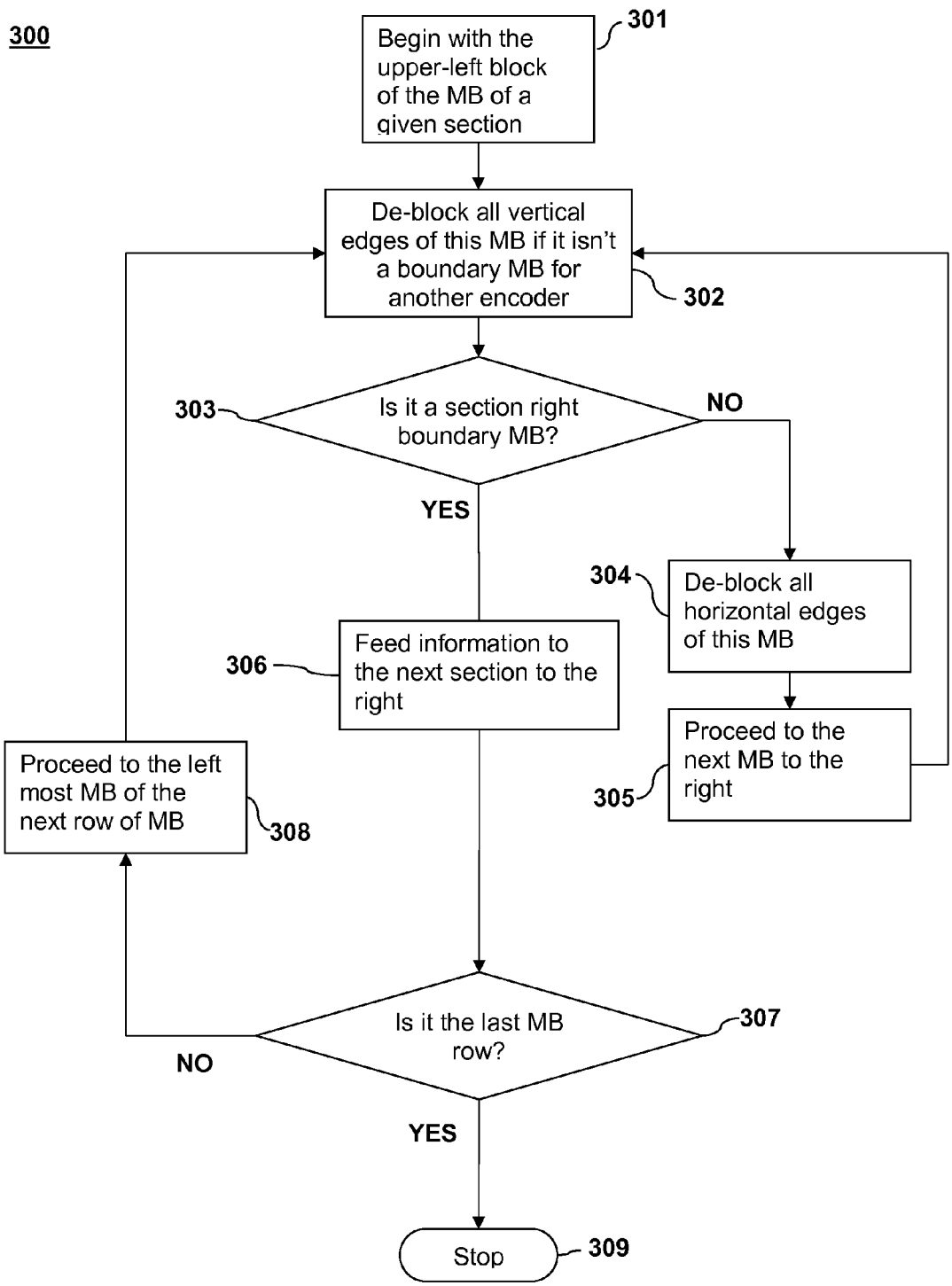
FIG. 3 is a flow diagram illustrating a general process of de-blocking in conjunction with parallel video encoding in accordance with an embodiment of the present invention.

FIG. 3 is a flow diagram illustrating an example of a general process of de-blocking 300 according to an embodiment of the present invention. By way of example, and not by way of limitation, the de-blocking process may be implemented starting from the block level and working its way up to the section level. Initially we have a section of a video picture (e.g., a vertical section S0, S1, . . . SN or a portion thereof, such as a single row,) to de-block. By way of example, and not by way of limitation, the de-blocking process 300 may begin with the uppermost leftmost block of the uppermost leftmost MB of the given section. However, the algorithm illustrated in FIG. 3 describes the de-blocking process starting with any arbitrary macroblock.

Starting with any given MB in the section, de-blocking may begin with the upper-left block of the MB being processed as indicated at 301. As discussed above, the de-blocking task for a given section may have a one MB column of overlap with the de-blocking of one or more neighbor sections. Consequently, the encoder unit for each section may perform part of the de-blocking for the section boundary macroblocks in a neighbor section. This overlap within the de-blocking task may facilitate de-blocking of boundaries between sections. If the given MB isn't a section boundary macroblock for another encoder, all vertical edges of this MB may be de-blocked as indicated at 302.

As used herein the term "section boundary sub-section" refers to a sub-section at the end of a row of an adjacent section. By way of example, a "section right boundary macroblock" refers to the left most macroblock in the section adjacent and to the right of the current section. Specifically, if the current section is section S0, the right boundary macroblocks for encoder E0 would be those in the left most column of macroblocks in section S1. It noted that in this example, the macroblocks in the left most column of section S1 would not be regarded as boundary macroblocks by section S1's encoder E1. The vertical edges of these macroblocks would have been de-blocked by encoder E0 and the de-blocking result transferred to encoder E1. It is further noted that since section S0 is the left most section the macroblocks in the left most column of section S0 are not boundary macroblocks for another encoder and de-blocking of these macroblocks does not overlap with another encoder. Consequently, encoder S0 may perform de-blocking of the vertical edges of these macroblocks.

At 303 it is determined whether the given MB is a section boundary macroblock. If the given MB is not a section boundary macroblock (e.g., a section right boundary MB), then all horizontal edges of the given MB may be de-blocked, as indicated at 304 and the algorithm may proceed to the next MB in the current row of the current vertical section (e.g., the next MB to the right), as indicated at 305 for de-blocking of the vertical edges as indicated at 302. If, at 303, the given MB is determined to be a section boundary MB then de-blocking data may be fed to the encoder unit performing de-blocking for the next section to the right as indicated at 306.

At 307 it may be determined whether the current MB is in the last row of the vertical section. If not, the algorithm may proceed to the first MB (e.g., the left-most MB) in the next row (e.g., the row below the current row) as indicated at 308. If the current row is the last row, the de-block process for the current section may stop, as indicated at 309.

After de-blocking has been finished and before the next picture inter search start, it is desirable for each encoder to exchange de-blocked pixels data with its left and right neighbor encoder units. These pixels may be used as reference pixels for inter prediction in the next picture. The number of exchanged pixels depends on the motion search range. For example, if an encoder searches [−32, +32] pixels around each block for the best prediction, each encoder unit may send 2 MB columns of pixels to both its left and right neighbor encoder units. To make pixel data exchange more efficient, the encoder may combines transfer right neighbor pixel transfer and right neighbor de-blocking result transfer into a single data transfer operation.

Figure 4:
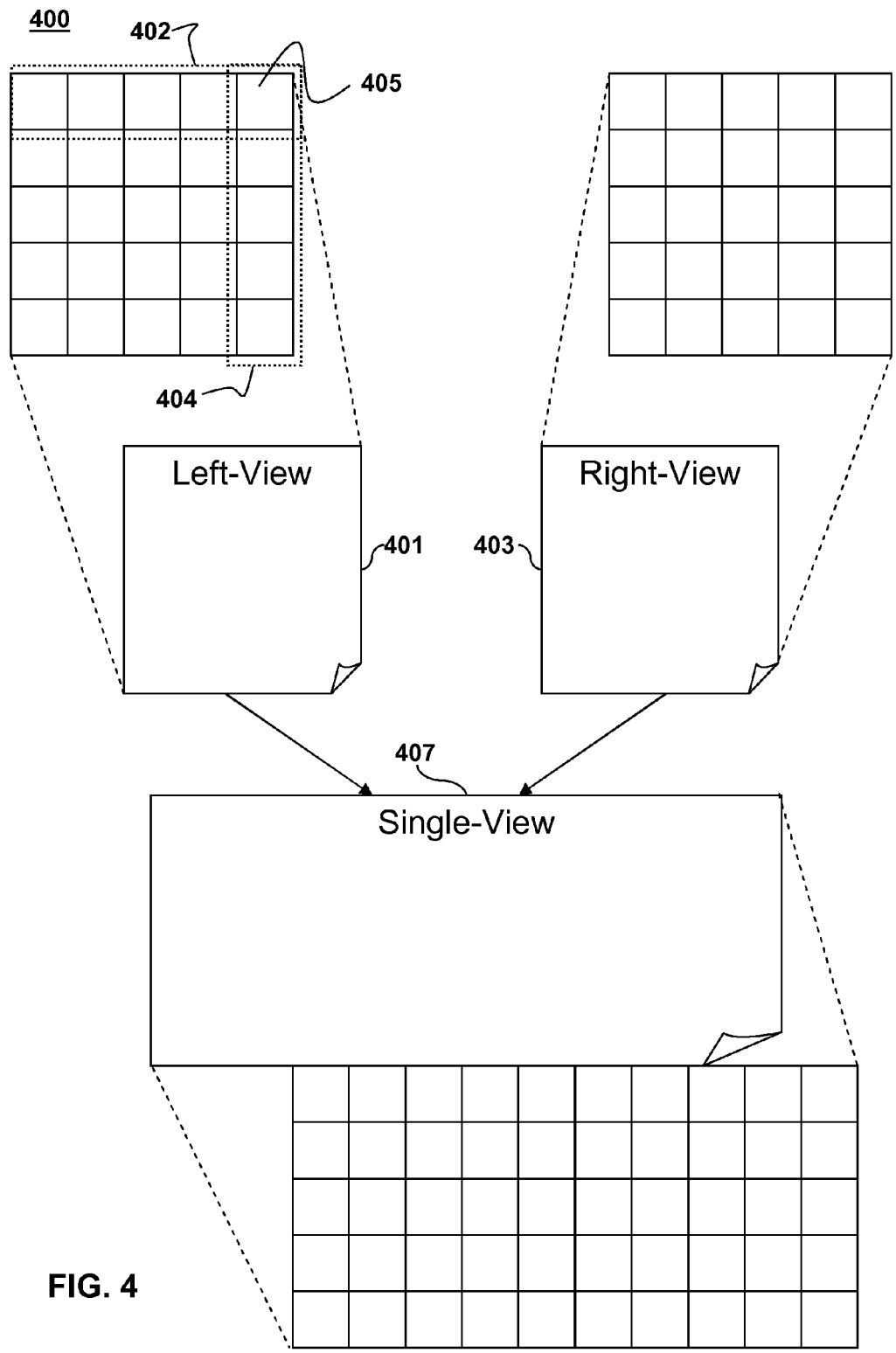
FIG. 4 illustrates an example of a method for multi-view parallel video encoding in accordance with an embodiment of the present invention.

The parallel video encoding process may also be implemented for multi-view (e.g., 3-D) video encoding. Multi-view video encoding requires more encoder units to work in parallel because of there are more than one number of views associated with a given video picture. When the section size being used in the parallel encoding process is too small (e.g., smaller than the motion search window), there may be bandwidth problems that occur due to the data dependency between encoder units. FIG. 4 illustrates a method for maintaining the number of encoder units that would be used for a single view video picture with a multi-view video picture 400, according to an embodiment of the present invention. By way of example, and not by way of limitation, the video picture being processed may include two views, a left view 401 and a right view 403. Each view may be made up of one or more columns 402 of macroblocks 405 and one or more rows 404 of macroblocks 405. In order to deal with the limited bandwidth of the encoder units being used, the two views may be combined to form one large picture 407 that incorporates pixel data from each of the two views. After forming one single view picture 407, that picture may be partitioned into the same number of sections as would have been used for a single view of a single picture 401, 403. This way, the encoding process may be done on half the number of encoder units as would have been necessary if the left-view picture 401 and the right-view picture 403 were processed separately.

The method of parallel encoding may be further optimized by implementing a method of fast intra-mode searching and early termination. The new AVC encoding standard allows for multiple reference pictures to be used in predicting a current coding picture. Because of this new standard, the probability of an encoding scheme choosing to use inter-prediction in encoding a current picture is much greater than the probability of an encoding scheme choosing to use intra-prediction in encoding a current picture. Inter-prediction, however, uses a large amount of hardware resources (e.g., CPU cycles and memory), and the data used for inter-prediction may not always fit into the cache or local memory. Thus, it is necessary to determine whether inter-prediction or intra-prediction is the best encoding method for a given picture. In doing so, the data associated with both inter-prediction and intra-prediction may be unable to fit on the same buffer, and so the efficiency of this process may be slowed down.

Figure 5:
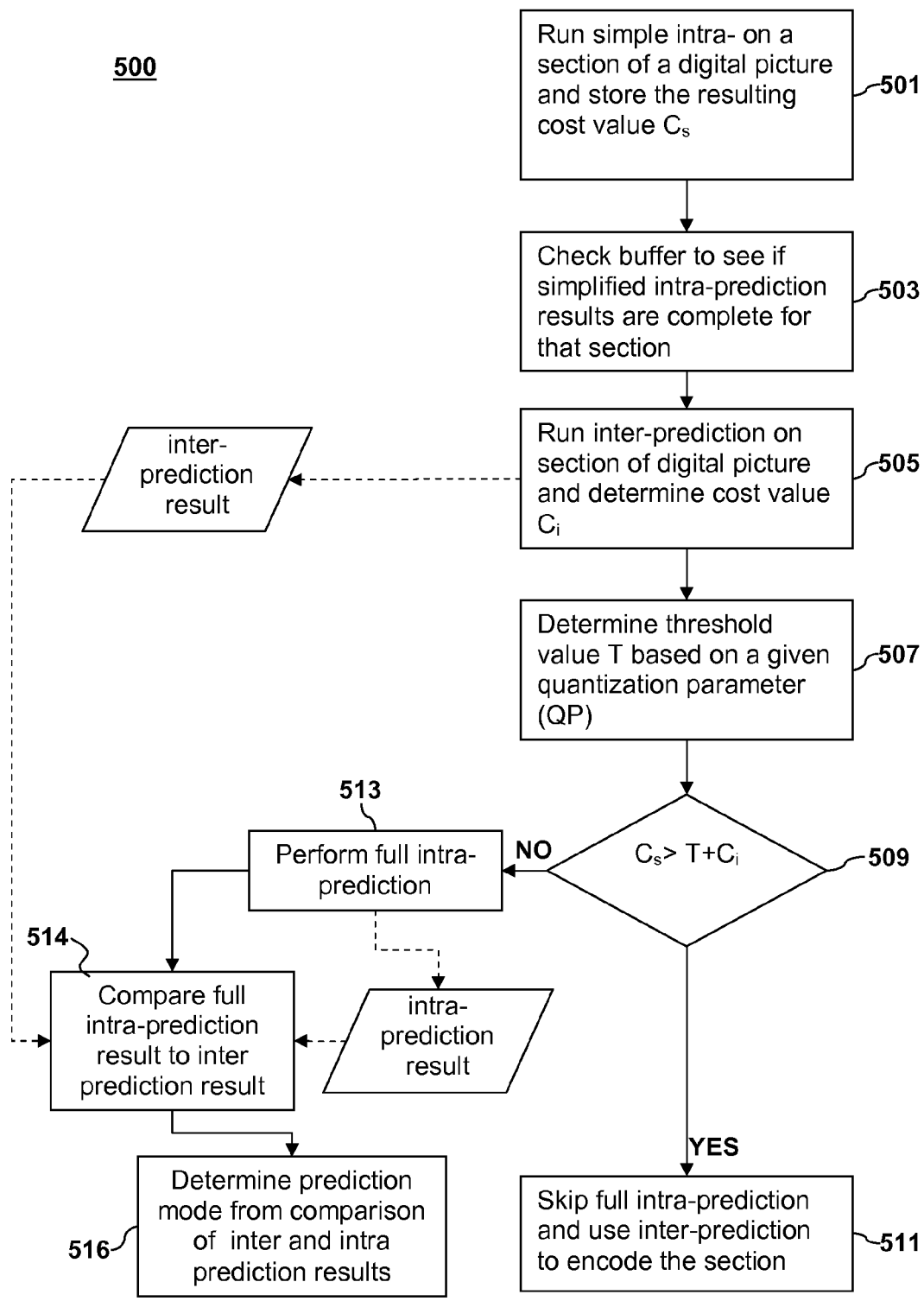
FIG. 5 is a flow diagram illustrating a method of fast intra-mode search and early termination in accordance with an embodiment of the present invention.

A solution to this issue involves implementing two different versions of intra-prediction. The first version of intra-prediction is a simplified version of intra-prediction that requires a much smaller amount of local memory and CPU cycle usage. The second version is a full version intra-prediction that requires a large amount of local memory and CPU usage. FIG. 5 depicts a flow diagram illustrating a process 500 by which an encoder program may determine whether inter-prediction or intra-prediction should be used for encoding a given picture. Although this example involves running intra-prediction and inter-prediction on parallel processor cores, the process 500 may be implemented without parallel processor cores.

Initially, we are given a video picture to encode. The video picture may be broken into sections, such that sections may be processed in parallel. The simplified intra-prediction is run on a section of a given video picture and a resulting cost value $C_s$ may be stored on a buffer as described at 501. By way of example, the simplified intra search need not wait for the intra prediction result of the left neighbor encoder unit's right most MB. In addition, the simplified intra search may use a simplified 16-bit quantization process.

In the simplified intra search task, starting at the most upper left MB of a given section, the encoder may search for the best intra prediction for the given input pixels. Then, the encoder unit may use the best prediction to calculate the prediction error. DCT transforms may be used to convert the prediction error into residual DCT coefficients. A simplified 16 bits quantization may be used to get quantized DCT coefficients. Then, a local decoding process may be used to construct a locally decoded macroblock. The locally decoded macroblock may be constructed from pixel predictors and quantized DCT coefficients. The locally decoded macroblock may be used to do intra prediction for its right and lower neighbor macroblocks. It is noted that in a preferred version of this embodiment, the quantized DCT coefficients in the intra search task may be used only to construct locally decoded MB for neighbor MB intra prediction and not used for entropy encoding.

The prediction cost value $C_s$ may be calculated from an estimated bit usage to encode the intra prediction mode code and a prediction error. An encoder search function may be used to find a prediction with the minimum cost, e.g., by minimizing a Lagrangian cost function. There are many published papers that describe how to estimate a prediction cost from prediction error and the best prediction mode code. Examples of such papers include Gary J. Sullivan and Thomas Wiegand, "Rate Distortion Optimization for Video Compression", IEEE Signal Processing Magazine, November 1998, pp. 74-90, which is incorporated herein by reference.

If simplified intra-prediction is too slow, the inter-prediction may read the buffer before the intra-prediction results are complete. To avoid this problem, the buffer may be checked as indicated at 503 to determine whether the simplified intra-prediction for that section is completed before the inter-prediction can begin for that section. The frequency of checking for a given picture depends on the buffer size.

Buffer size may be used to relax the timing constraint between two tasks. For example, if the buffer can hold data for only one MB, the intra task has to start after the inter task has consumed the previous intra task output MB and the inter task has to start after the intra task finished one MB. It is a very significant timing constraint for both intra and inter task. But, if the buffer can hold 100 MBs, the intra task may start after the inter task has consumed anywhere from 1 to 100 MBs. The inter task could start when the intra task has output 1 to 100 MBs. In this case, the timing constraints for both tasks are much more relaxed. In one particular encoder implementation, there may be a hard sync between all encoder units and tasks for every frame. For such an implementation a buffer size larger than one frame doesn't make any difference. Therefore, in such an implementation, the buffer size may be the same as the number of MBs in a frame.

The check frequency cannot be longer than one task to finish the whole buffer and cannot be shorter than once per MB. If the check frequency is high, for example, once per MB, the inter task may start one MB after the intra task. However, checking once per MB results in a relatively large number of check operations, which may consume a significant number of processor cycles. Alternatively, the check frequency may be low, for example, once per 100 MBs. In such a case, the inter task only can start after the intra search task is finished for 100 MBs. As a result, within the first 100 MBs, only the intra task is running. Such a low check frequency may reduce the degree of parallelism. In one particular implementation, the encoder may check once per MB row.

Once the simplified intra-prediction is completed for a given section, inter-prediction may be run on the same section of the video picture and a cost value $C_i$ for inter-prediction is determined as described at 505. The inter-prediction cost value $C_i$ may be calculated in a manner similar to the calculation for the intra-prediction cost $C_s$ described above. The inter-prediction cost calculation inputs may include the estimated bits usage to encode motion vectors and the inter prediction error.

This process may be repeated for all sections of a given picture. Once the cost values of simplified intra-prediction and inter-prediction of an entire picture are determined, a threshold value T may be determined given a desired quantization parameter (QP) as described at 507.

The threshold value may be determined empirically within some general guidelines. If the threshold value T is set too low, the encoder quality tends to drop. If the threshold is too high, the encoder tends to use too many cycles to do a full intra-mode search. A lookup table may be used to set the threshold T for each desired QP value. The lookup table may be trained by a list of selected input test streams.

The simplified intra-prediction cost value $C_s$ may then be compared to the sum of the inter-prediction cost value $C_i$ and the threshold value T as described at 509. If the simplified intra-prediction cost value $C_s$ is greater than $C_i+T$, then the full intra-prediction is bypassed and inter-prediction is used to encode the picture as described at 511. If $C_s$ is not greater than $C_i+T$, full intra prediction may be executed as indicated at 513. Then, as is conventionally done, the full intra search result may be compared with the inter search result as indicated at 514. The result of the comparison may be used to make a final decision on which prediction mode should be used to encode the picture as indicated at 516.

The use of full intra-prediction will not occur with high frequency, and so it is unlikely to affect the overall speed of the encoding process. Because inter-prediction will likely be used at a much greater frequency than intra-prediction, using this method of mode searching increases efficiency by eliminating the need to use the full intra-mode prediction for every section of a given video picture.

It is important to note that this method of fast intra-mode searching and early termination may be implemented independently from the parallel encoding scheme. This method may be used with any encoding scheme, and will optimize the performance of mode searching due to its ability to eliminate the full intra-mode search for a given video picture.

To even further optimize the encoding of a video stream, a method of compressing variable length symbols may be implemented within the parallel encoding procedures, such as entropy coding, described above. A result of part of the encoding process, e.g., entropy coding, may be a variable length code representing the encoded picture. As a further optimization to the encoding process the variable length code may be further compressed before being transferred across a network for decoding.

Each variable length code is composed of multiple tokens, which are defined as signals used to represent a subsection of the variable length code. Existing compression methods use lookup tables to determine the bit representation of each token. Each token is given a bit representation with a set number of bits depending on the largest token being compressed. For those tokens without a corresponding entry in the lookup table, a calculation is used to determine its bit representation. Because the lookup table is used far more frequently in compressing a given variable length code, the lookup speed is often a limiting factor in the compression of data. Existing methods are therefore inefficient because small tokens are encoded by the same number of table lookup operations as large tokens, slowing down the compression process.

Figure 6A:
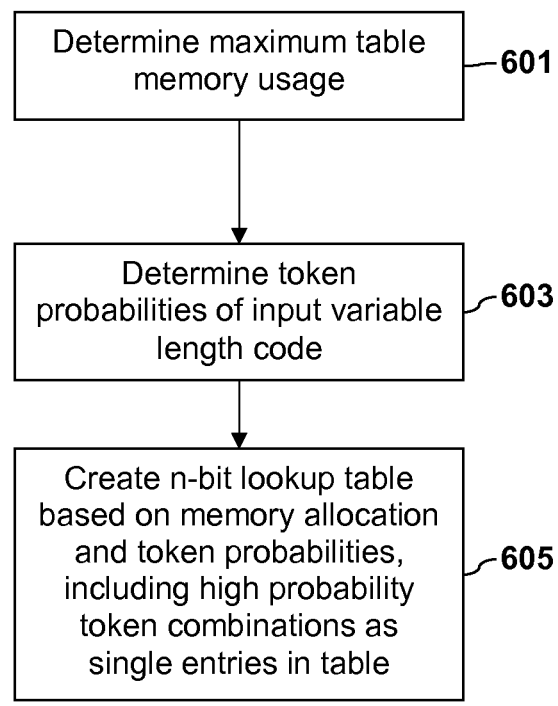
FIG. 6A is a flow diagram illustrating a method of creating a multi-token table for use in compressing variable length symbols during entropy coding in accordance with an embodiment of the present invention.
Figure 6B:
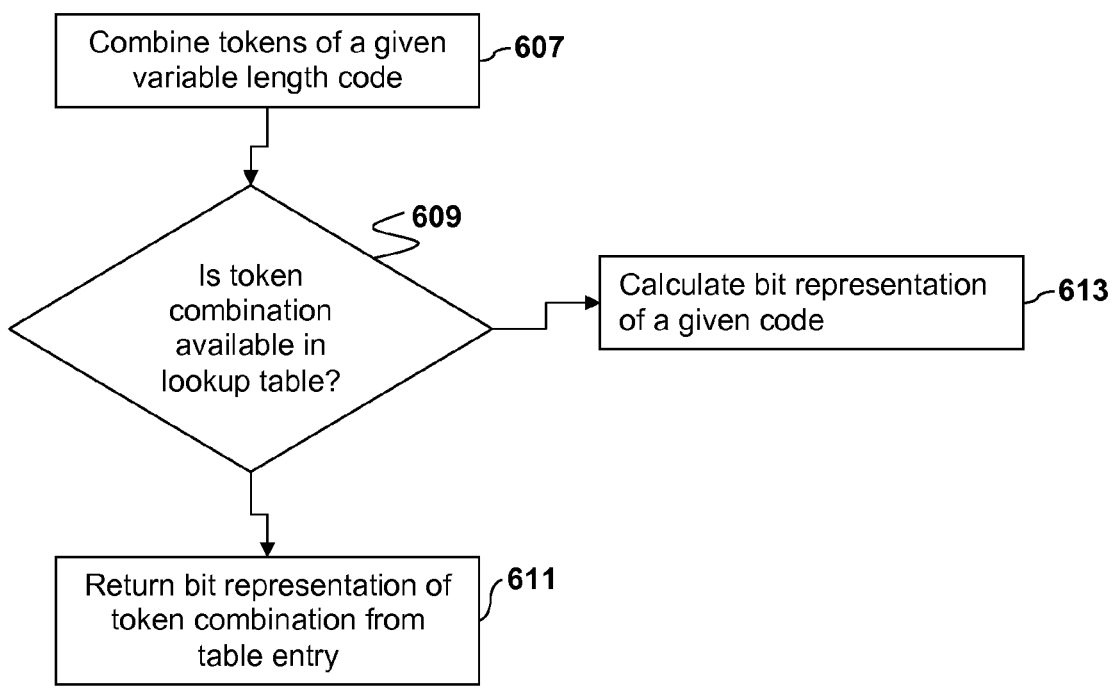
FIG. 6B is a flow diagram illustrating a method of compressing variable length symbols during entropy coding in accordance with an embodiment of the present invention.

In a given variable length code, smaller tokens have a higher probability of occurrence and larger tokens have a lower probability of occurrence. Thus, the compression process may be optimized by encoding higher probability tokens with fewer lookup operations and lower probability tokens with more lookup operations. FIG. 6A illustrates a method for generating a lookup table having multi-token combinations that may be used for fast compression of variable length symbols. FIG. 6B illustrates a method 600 for fast compression using multi-token combinations that may be implemented by encoder unit software or hardware.

Referring to FIG. 6A, a programmer may first determine a memory allocation in order to derive an appropriate table size for compression as described at 601. The programmer may then determine the token probabilities of an input variable length code in order to optimize the table lookup entries for compression as described at 603. Based on the memory allocation and the token probabilities, an n-bit lookup table may be formulated as described at 605. The n-bit lookup table need not give each individual token an n-bit representation. Instead, two or more high probability tokens that may be represented with less than n-bits may be concatenated together to form a token combination, which may then be given an n-bit representation. This allows for the lookup table to represent multiple token combinations in a single table entry rather than allocating an entire table entry for a single token. Each table entry may contain 2 integers. One integer, referred to herein as the bits buffer, contains the coded bits representation of the symbol. Another integer, referred to herein as the coded length, is the bit length of the coded symbol. Encoding multiple tokens in this way can increase the lookup speed in the compression process during entropy coding.

As seen in FIG. 6B, for a given variable length code, a coder program may form a token combination from two or more subsections of the code as indicated at 607. Once a given token combination is formed, the encoder program may compare the token combination against the lookup table to determine whether the given token combination has a corresponding entry in the lookup table as described at 609. If the token combination does have a corresponding entry in the lookup table, then a bit representation is returned to the processor for compression as described at 611. If however, the token combination does not have a corresponding entry in the lookup table, e.g., because it is of low probability, then a calculation may be made to determine its bit representation as indicated at 613. The result of this calculation may be returned to the processor for compression.

The formula used in calculating the bit representation may depend on the type of token and encoding standard involved. For example, according to the AVC standard, different token types are encoded according to different formulae. For example, if a token is Exp-Golomb coded, the decoding process is defined in AVC standard section 9.1. This decoding process is also described below. The encoding process of Exp-Golomb code is the reverse process of the decoding process.

The encoding process is,

1. For a given integer number (called codeNum), split the number into two parts, $2^n-1$ and m. Where, CodeNum=$2^n$-1+m and m<$2^n$-1.
2. Code the binary representation of CodeNum as n number of zeros followed by one bit of 1 and a n-bit integer with value m.

For example, if CodeNum is 38, then, since 38=$2^5$-1+7, n=5 and m=7. So, the compressed representation of 38 is 00000100111

The process depicted in FIG. 6B may be repeated until the entire variable length code has been compressed. Because the lookup table will be used at a much higher rate than the calculation to determine the bit representation of a given token or token combination, the calculation will not slow down the compression process. Moreover, being able to combine multiple tokens into a single lookup table entry will optimize the speed of compression.

It is important to note that the method for fast compression of variable length symbols may be implemented independently from the parallel encoding scheme. This method may be used with any encoding scheme, and will optimize the performance of data compression due to its ability to combine multiple tokens into a single lookup table entry rather than allocating a table entry for each individual token.

By way of example, and not by way of limitation, in the AVC standard a coded unsigned integer (codeNum) of an exp-golomb symbol may be given by $$codeNum=(2^{leadingZeroBits}-1+\text{read\_bits}(\text{leadingZeroBits}))$$

Here, the codeNum is the decoded result of the symbol. The actual encoding process is the reverse of the above equation. But, due to limitations limited on the table size, lookup based symbol encoding may only be used up to a limited codeNum value. For example, if a table only has 64 entries, the maximum codeNum value would be 63. For another example, if one bits buffer entry only has 16 bits, the maximum codeNum would be 254. Fortunately, large symbols are statistically less likely than small value symbols. In a typical case, even a symbol value larger than 10 is not likely to happen. So, it is possible to branch out for large symbols and only do table lookup for these symbols which are in the table's limitation.

In another case, if the hardware allows a large lookup table, it is inefficient to create a large table to encode a single large symbol. In this embodiment, a large table may be used to encode multiple small symbols instead of encoding a single large symbol. For example, a table of 65535 entries and 32 bits per bits buffer entry could be used to encode a single symbol with codeNum up to 65534. Alternatively, the same table could be used to encode 4 symbols together with codeNum up to 14. In a multiple symbol table, each bits buffer entry has combined coded bits of multiple symbols. The coded length is the sum of all coded symbols.

In a more practical implementation, the lookup size may depend on the available memory size. The tradeoff between number of symbols per entry and the maximum codeNum value depends on the statistical result of a particular application. To cover all possible codeNum values, there are a large table to encode multiple small symbols together, a small table to encode one single bigger symbol and a branch out function to encoder really huge symbols.

By way of example, as specified in the AVC coding standard, a signed integer and MB coded block pattern encoding could be converted into unsigned integer for exponential golomb (exp-golomb) encoding. In the AVC standard certain symbols, such as coeff token, trailing_ones_sign_flag, level_prefix, level_suffix, total_zero and run_before, are not encoded by the exp-golomb method.

In a typical prior art encoder, there are data dependencies in the encoding process of trailing_ones_sign_flag, level_prefix and level_suffix. So, a prior art encoder only can encode them sequentially. But, according to certain embodiments of the invention, one can combine trailing_ones_sign_flag, level_prefix and level_suffix encoding into one table. Then, these data dependencies could be converted into dependencies between entries of a table or within the same entry of a table. For this table, the input is a few non-zero discrete cosine transform (DCT) coefficients, the number of total non-zero coefficients and the number of coefficients already been coded. The output of the table is the coded bits and the bit length. The coded bits may include trailing_ones_sign_flag, level_prefix, level_suffix or a mix of these symbols. Multiple run before symbols may also be coded in one entry as a way to encode multiple exp-golomb symbols, except the maximum run_before value is 15. So, no large table is necessary for run_before.

After optimization for variable length encoding, the only sequential process is writing the lookup result into the coded video stream buffer. This may be done after multiple table lookup operations. It is noted that it is generally not necessary to know which output bits are used for which symbol if the next step after optimization is to write all the bits to an output bit stream buffer.

To further speed up the encoding process, the encoder could do all table look up operations in parallel. Some table index calculations may be done in SIMD style so that multiple table indexes could be calculated together. Putting more independent instructions in the same code block also helps the compiler to schedule the execution pipeline more efficiently. It is also easier for a superscalar machine to find out independent instructions to run for each clock cycle.

Figure 7:
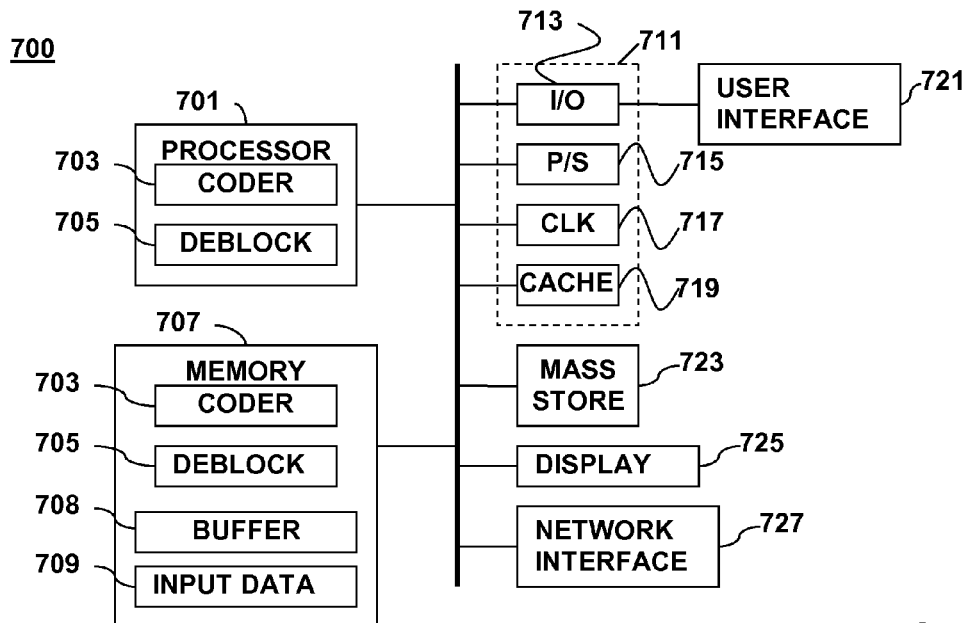
FIG. 7 illustrates a block diagram of an example of a computer apparatus that may be used to implement parallel encoding in accordance with an embodiment of the present invention.

FIG. 7 illustrates a block diagram of an example of a computer apparatus 700 that may be used to implement massive parallel encoding as described above. The apparatus may include generally a processor module 701 and a memory 707. The processor module 701 may include one or more processor cores. An example of a processing system that uses multiple processor modules, is a CELL processor, examples of which are described in detail, e.g., in Cell Broadband Engine Architecture, which is available online at http://www-306.ibm.com/chips/techlib/techlib.nsf/techdocs/1AEEE1270EA2776387257060006E61BA/$file/CBEA_01_pub.pdf, which is incorporated herein by reference.

The memory 707 may be in the form of an integrated circuit, e.g., RAM, DRAM, ROM, and the like. The memory may also be a main memory that is accessible by all of the processor modules of a multiple processor module processing system. In some embodiments, the processor module 701 may include multiple processor cores and local memories associated with each core. A coder program 703 may be stored in the main memory 707 in the form of processor readable instructions that can be executed on the processor module 701. The coder program 703 may be configured to encode a video picture into compressed signal data and/or to decode compressed signal data. By way of example, and not by way of limitation, a coder program 703 may be configured to implement encoding in parallel according to the processes described above. The coder program 703 may also be configured to implement the method of fast intra-mode searching and early termination described in FIG. 5, as well as the method of compressing variable length symbols described in FIG. 6.

A de-blocking program 705 may also be stored in the memory 707. The de-blocking program 705 may include instructions that, when executed by the processor module 701 implements de-blocking of video pictures as described above, e.g., according to the method described in FIG. 3. The de-blocking program 705 may be implemented as part of the coder program or as a function or subroutine that may be called by the coder program 703. The coder program 703 and de-blocking program 705 may be written in any suitable processor readable language, e.g., C, C++, JAVA, Assembly, MATLAB, FORTRAN and a number of other languages.

Input data 709 may be stored in the memory 707. Such input data may include buffered portions of streaming data, e.g., encoded video pictures or sections thereof. During execution of the coder program 703 and/or the de-blocking program 705, portions of program code and/or data 709 may be loaded into the memory 707 or the local stores of processor cores for parallel processing by multiple processor cores. By way of example, and not by way of limitation, the input data 709 may include video pictures, or sections thereof, before encoding or at intermediate stages of encoding. These various sections may be stored in one or more buffers 708, which may be implemented in the memory 707. In particular, sections may be stored in an output picture buffer implemented in the memory 709.

The apparatus 700 may also include well-known support functions 711, such as input/output (I/O) elements 713, power supplies (P/S) 715, a clock (CLK) 717, and cache 719. The apparatus 700 may optionally include a mass storage device 723 such as a disk drive, CD-ROM drive, tape drive, or the like to store programs and/or data. The apparatus 700 may also optionally include a display unit 725 and user interface unit 721 to facilitate interaction between the apparatus 700 and a user. The display unit 725 may be in the form of a cathode ray tube (CRT) or flat panel screen that displays text, numerals, graphical symbols, or images. The user interface 721 may include a keyboard, mouse, joystick, light pen or other device that may be used in conjunction with a graphical user interface (GUI). The apparatus 700 may also include a network interface 727 to enable the device to communicate with other devices over a network, such as the Internet. These components may be implemented in hardware, software, or firmware or some combination of two or more of these.

Figure 8:
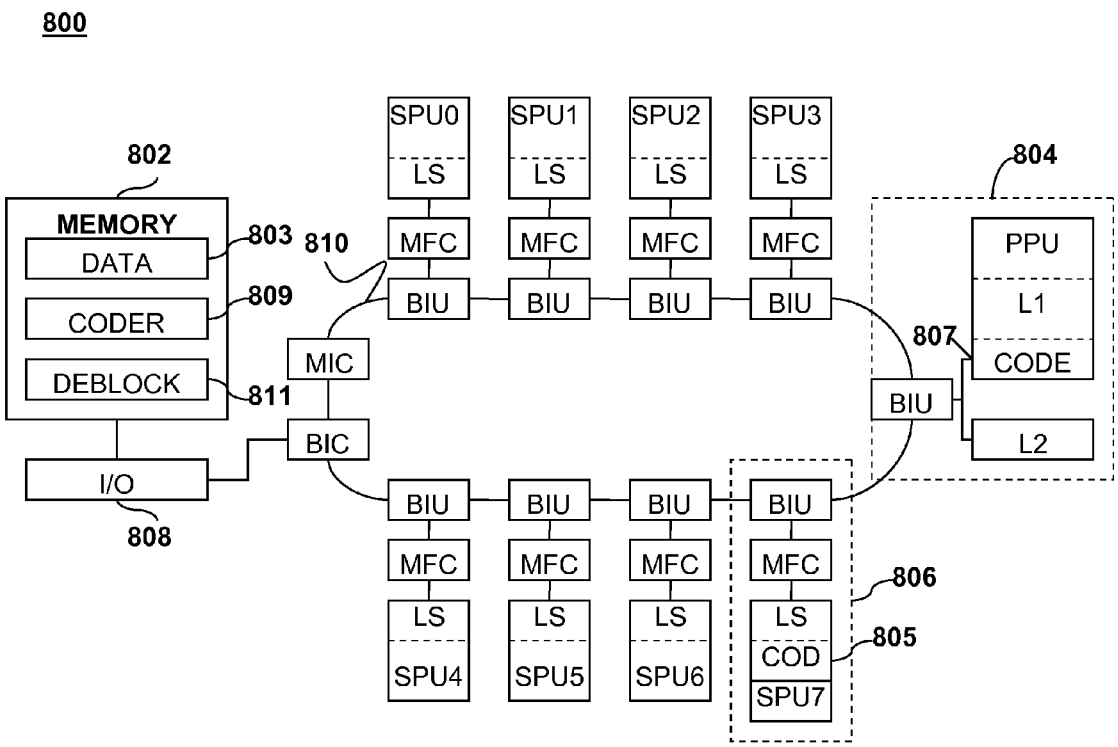
FIG. 8 illustrates an example of a CELL processor that may be apparatus that may be used to implement parallel encoding in accordance with an embodiment of the present invention.

There are a number of ways to streamline parallel processing with multiple processors in the apparatus 700. One example, among others of a processing system capable of implementing parallel processing on three or more processors is a CELL processor. There are a number of processor architectures that may be categorized as CELL processors. By way of example, and without limitation, FIG. 8 illustrates a type of CELL processor 800. The CELL processor 800 includes a main memory 802, a single power processor element (PPE) 804, and eight synergistic processor elements (SPE) 806. Alternatively the CELL processor 800 may be configured with any number of SPEs. With respect to FIG. 8, the memory 802, PPE 804, and SPEs 806 can communicate with each other and with an I/O device 808 over a ring-type element interconnect bus 810. The memory 802 may contain input data 803 having features in common with the input data described above, a coder program 809 having features in common with the coder program described above, and a de-blocking program having features in common with the de-blocking program described above. At least one of the SPE 806 may include in its local store (LS) de-blocking instructions 805 and/or a portion of the buffered input data that is to be processed in parallel, e.g., as described above. The PPE may include in its L1 cache, code instructions 807 having features in common with the coder program described above. Instructions 805 and data 807 may also be stored in memory 802 for access by the SPE and PPE when needed.

By way of example, the PPE 804 may be a 64-bit PowerPC Processor Unit (PPU) with associated caches. The PPE 804 may include an optional vector multimedia extension unit. Each SPE 806 includes a synergistic processor unit (SPU) and a local store (LS). In some implementations, a local store may have a capacity of, e.g., about 256 kilobytes of memory for code and data. The SPUs are less complex computational units than PPU, in that they typically do not perform any system management functions. The SPUs may have a single instruction multiple data (SIMD) capability and typically process data and initiate any required data transfers (subject to access properties set up by a PPE) in order to perform their allocated tasks. The SPUs allow the system 800 to implement applications that require a higher computational unit density and can effectively use the provided instruction set. A significant number of SPUs 805 in a system, managed by the PPE 804, allows for cost-effective processing over a wide range of applications. By way of example, the CELL processor 800 may be characterized by an architecture known as Cell Broadband engine architecture (CBEA). In CBEA-compliant architecture, multiple PPEs may be combined into a PPE group and multiple SPEs may be combined into an SPE group. For the purposes of example, the CELL processor 800 is depicted as having only a single SPE group and a single PPE group with a single SPE and a single PPE. Alternatively, a CELL processor can include multiple groups of power processor elements (PPE groups) and multiple groups of synergistic processor elements (SPE groups). CBEA-compliant processors are described in detail e.g., in Cell Broadband Engine Architecture, which is available online at: http://www-306.ibm.com/chips/techlib/techlib.nsf/techdocs/1AEEE1270EA2776387257060006E61BA/$file/CBEA_01_pub.pdf, which is incorporated herein by reference.

Figure 9:
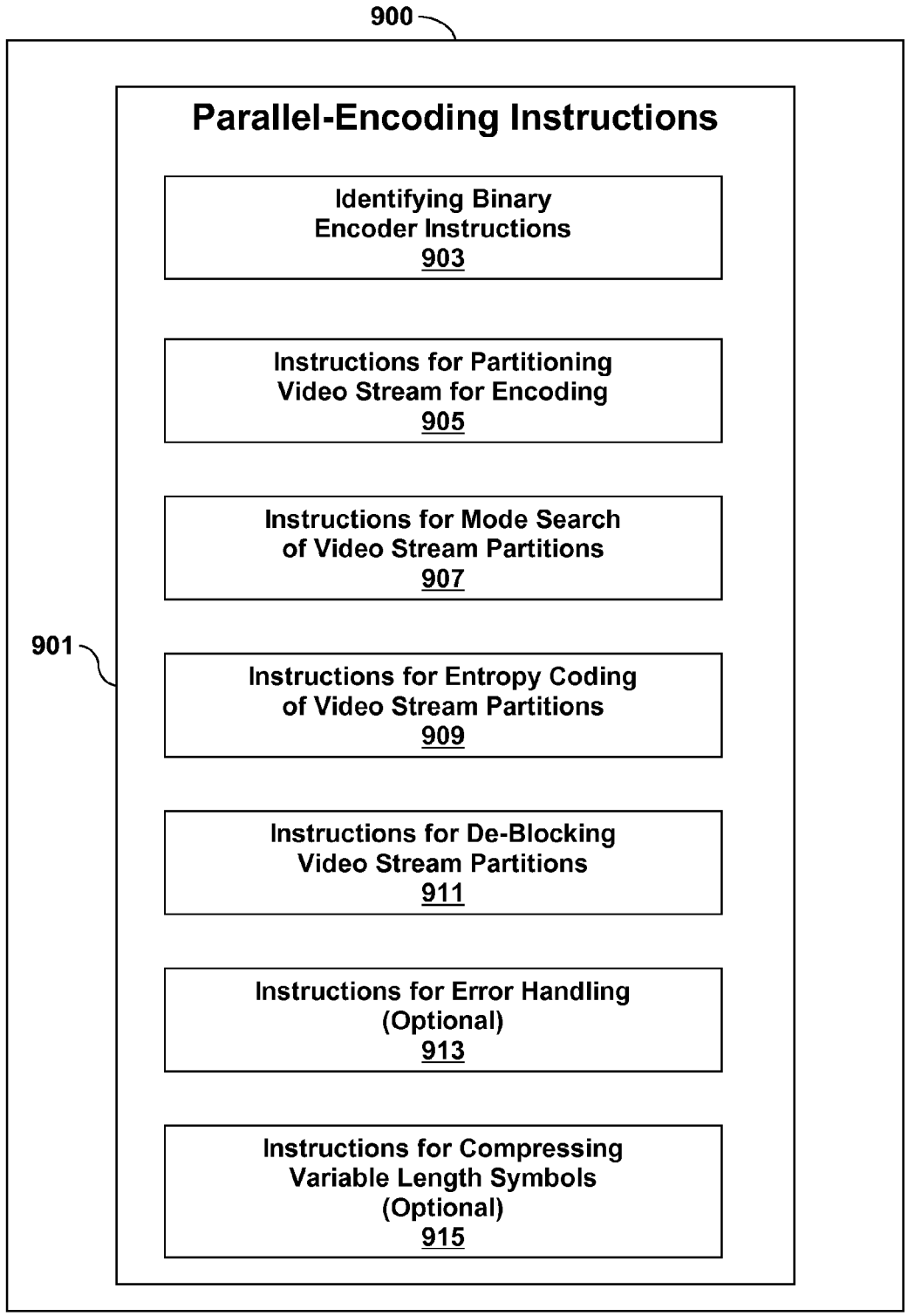
FIG. 9 illustrates an example of a computer-readable storage medium encoded with computer readable instructions for implementing parallel encoding in accordance with an embodiment of the present invention.

According to another embodiment, instructions for carrying out parallel encoding may be stored in a computer readable storage medium. By way of example, and not by way of limitation, FIG. 9 illustrates an example of a computer-readable storage medium 900. The storage medium contains computer-readable instructions stored in a format that can be retrieved and interpreted by a computer processing device. By way of example and not by way of limitation, the computer-readable storage medium 900 may be a computer-readable memory, such as random access memory (RAM) or read only memory (ROM), a computer readable storage disk for a fixed disk drive (e.g., a hard disk drive), or a removable disk drive. In addition, the computer-readable storage medium 900 may be a flash memory device, a computer-readable tape, a CD-ROM, a DVD-ROM, a Blu-Ray, HD-DVD, UMD, or other optical storage medium.

The storage medium 900 contains parallel-encoding instructions 901 configured to implement parallel-encoding upon execution by a processor. The parallel-encoding instructions 901 may include instructions for identifying encoder units 903, such that a master encoder unit and its corresponding client encoder units are identified in order to process a video stream in parallel. In addition, the parallel-encoding instructions 901 may include instructions for partitioning the video stream 905 so that each individual encoder unit may process a partition of the video stream in parallel with all of the other encoder units. The parallel-encoding instructions 901 may also include instructions for performing a mode search on the video stream partitions 907. The mode search may be optionally implemented using the fast intra-mode search and early termination method described in FIG. 5.

Additionally the parallel-encoding instructions may include instructions for entropy coding the video stream partitions 909 as well as instructions for de-blocking the encoded video stream partitions 911. The parallel-encoding instructions 901 may also optionally include instructions for dealing with errors that may occur during the encoding process 913. The error handling instructions 913 may centralize the handling of errors to the master BE, such that all errors are first reported to the master BE, and then a decision is made by the master BE in accordance with how the client encoder units shall handle the errors. By way of example, and not by way of limitation, two possible error-handling options are: 1) the error is deemed unrecoverable, the client units are relayed this information and the user is told to give up on encoding the current video stream; and 2) the error is recoverable and so adjustments are made to the picture coding decisions (e.g., QP) and the clients are instructed to re-encode the faulty video pictures by treating them as new video pictures. Lastly, the parallel encoding instructions 901 may optionally include instructions for compressing variable length symbols that result from the encoding process 915, e.g., as described with respect to FIGS. 6A-6B.

Embodiments of the present invention allow for more efficient and faster encoding of digital pictures that take full advantage of the capabilities of a parallel processor. In certain embodiments and examples described above all three of mode search, entropy coding and de-blocking are performed in parallel for different sections of a digital picture with two or more encoder units. However, in other embodiments one or two of the mode search, entropy coding, or de-blocking processes may be performed on a single encoder unit for the entire picture with the remaining one or two processes being performed in parallel for different sections on different encoder units.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for mode searching and early termination of a video picture, comprising:

a) determining the cost value of a simple intra-mode prediction of the video picture;

b) determining the cost value of an inter-mode prediction of the video picture;
c) determining a threshold value based on a given quantization parameter (QP);
d) comparing the cost value of the simple intra-mode prediction to the sum of the cost value of the inter-mode prediction and the threshold value; and
e) performing a mode-prediction of the video picture in accordance with the result obtained in d).

2. The method of claim 1, wherein e) includes performing an inter-mode prediction if the cost value of the simple intra-mode prediction is greater than the sum of the cost value of the inter-mode prediction and the threshold value.

3. The method of claim 1, wherein e) includes performing an intra-mode prediction if the cost value of the simple intra-mode prediction is lower than the sum of the cost value of the inter-mode prediction and the threshold value.

4. The method of claim 1, wherein the simple intra-mode prediction for a given section does not wait for an intra prediction result of neighbor section.

5. The method of claim 1, wherein the simple intra-mode search uses a simplified 16-bit quantization process.

6. The method of claim 1, wherein the simplified intra-mode search includes a search for the best intra prediction for input pixels of a given macroblock in a section,
using the best intra prediction to calculate a prediction error,
converting the prediction error into residual DCT coefficients using DCT transforms,
constructing a locally decoded macroblock
using the locally decoded macroblock to do intra prediction for one or more neighbor macroblocks of the given macroblock.

7. The method of claim 6 wherein a simplified 16 bit quantization is used to obtain quantized DCT coefficients.

8. The method of claim 7 wherein the locally decoded macroblock is constructed from pixel predictors and the quantized DCT coefficients.

9. The method of claim 7, wherein the quantized DCT coefficients are not for entropy encoding.

10. The method of claim 6 wherein locally decoded macroblock is used to do intra prediction for its right and lower neighbor macroblocks.

* * * * *